United States Patent [19]

Fujiwara et al.

[11] Patent Number: 5,656,689
[45] Date of Patent: Aug. 12, 1997

[54] PROCESS FOR PREPARING COPOLYMER LATEX AND USE THEREOF

[75] Inventors: Wataru Fujiwara; Junkoh Hyoda, both of Niihama; Kenichi Yamazaki, Kobe; Noriko Kitamura, Osaka, all of Japan

[73] Assignee: Sumitomo Dow Limited, Osaka, Japan

[21] Appl. No.: 532,872

[22] Filed: Sep. 22, 1995

Related U.S. Application Data

[62] Division of Ser. No. 443,035, May 17, 1995, which is a division of Ser. No. 108,596, Sep. 3, 1993, abandoned.

[30] Foreign Application Priority Data

| Jan. 10, 1992 | [JP] | Japan | 4-21955 |
| Jan. 27, 1992 | [JP] | Japan | 4-37059 |
| Feb. 3, 1992 | [JP] | Japan | 4-47999 |
| Jun. 18, 1992 | [JP] | Japan | 4-186054 |
| Jun. 30, 1992 | [JP] | Japan | 4-197849 |

[51] Int. Cl.$^6$ .................................................. C08L 33/00
[52] U.S. Cl. .............................................. 524/822; 524/836
[58] Field of Search ...................................... 524/822, 836

[56] References Cited

U.S. PATENT DOCUMENTS 3,265,677  8/1966  Delacretaz et al. ................ 526/207

*Primary Examiner*—Peter D. Mulcahy

[57] ABSTRACT

A process for preparing a copolymer latex comprising emulsion polymerizing an aliphatic conjugated diene monomer and other monomer copolymerizable therewith in the presence of a cyclic unsaturated hydrocarbon having one unsaturated bond in a ring, in which, preferably a monomer mixture which does not contain the aliphatic conjugated diene monomer is added after the addition of a monomer mixture containing the aliphatic conjugated diene monomer, or a part of a chain transfer agent is added after the addition of the monomers. This copolymer latex is useful as an adhesive composition, a paper coating composition, an adhesive composition for back-sizing carpets, an adhesive composition for rock fiber materials, a paper coating composition for gravure printing, and a color developing composition for a pressure sensitive copying paper.

8 Claims, No Drawings

PROCESS FOR PREPARING COPOLYMER LATEX AND USE THEREOF

This is a division of application Ser. No. 08/443,035 filed on May 17, 1995 which is a division of Ser. No. 08/108,596 filed Sep. 3, 1993 now abandoned.

FIELD OF THE INVENTION

The present invention relates to a novel process for preparing a copolymer latex and use of the copolymer latex prepared by the novel process.

DESCRIPTION OF THE RELATED ART

It is well known that a butadiene copolymer latex comprising butadiene is widely used in the fields of paper coating or back-sizing of a carpet, or as a binder for rock fiber materials.

Properties required for the binder widely vary with the application fields and, in general, according to the required properties, a composition or structure of the butadiene copolymer latex are changed.

The copolymer latex is usually prepared by emulsion polymerization. In the preparation, fine coagulated particles are formed though there is some difference depending on a composition of a monomer mixture and kinds and amounts of additives contained in the copolymer latex.

The fine coagulated particles adhere to a reactor and have adverse affects on the reaction process. Further, they exert baneful influences on the final use of the latex.

That is, in the paper coating field, when an amount of such coagulated particles is large, there arise various troubles such as streak trouble, contamination of an applicator, contamination in a calendering step, blanket piling in a printing step, and the like.

The copolymer latex is used as a carpet-back sizing adhesive for a tufted carpet or a needle punched carpet, or an adhesive of rock fiber materials which are used as a cushioning material for an automobile, a mat for construction, an industrial filter, etc. In such use, the fine coagulated-particles have adverse affects on bond strength or water resistance.

Since the fine coagulated particles in the copolymer latex not only contaminate the reactor, but also exert baneful influences on the final use of the latex, they are usually removed by filtration or other methods.

However, the filtration process is complicated and an amount of the removed fine coagulated particles is limited, so that it is very difficult to remove the fine coagulated particles completely. Further, such removing process should decrease the productivity.

In the paper coating field, a coating speed in the production process of the coated paper is increased in view of rationalization, and a paper coating composition which is excellent in a high speed coating property is strongly desired.

Not only the coating speed but also a printing speed with the coated paper are made higher. Then, the coated paper is required to have better high speed printability.

Namely, the paper coating composition should have good flowability and mechanical stability in the high speed coating step, and the coated paper should have good bond strength, blister resistance and printing gloss.

Among these properties, the bond strength is improved by increasing a content of an aliphatic conjugated diene (butadiene) which is one of the components in the copolymer latex. That is, the bond strength is improved by the increase of tackiness of the copolymer latex. But, this method will cause the following problems in the preparation of the coated paper.

In general, most of the paper used as a printing paper are coated papers both surfaces of which are coated. In the preparation of the double coated paper, one surface of the paper is coated with a first coater and, after drying, the other surface of the paper is coated with a second coater. In the second coating step, the coated layer on the first surface adheres to and accumulate on a roll which supports the paper to contaminate the roll, namely cause so-called backing roll contamination. If the roll is contaminated, not only the properties of the coated paper such as smoothness and gloss are deteriorated, but also the coating process should be sometimes stopped to clean the contaminated roll, this resulting in the decrease of operating efficiency.

The tackiness of the copolymer latex which is used as the binder is said to be one of the causes for the backing roll contamination. Therefore, when the content of the aliphatic conjugated diene in the copolymer latex is increased to improve the bond strength of the coated paper, the backing roll contamination is promoted.

To solve the above problems, the improvement of the copolymer latex has been studied. However, any of the conventional copolymer latexes is unsatisfactory.

Therefore, it is highly desired to provide a copolymer latex which can give a coated paper having, in good balance, a bond strength which can cope with the high speed printing in these years, and resistance to backing roll contamination.

Sometimes, the copolymer latex has a troublesome odor due to, in particular, an alkylmercaptane which is used as a chain transfer agent. Since this odor decreases a commercial value of the final product, a copolymer latex which generates less odor is required.

By the way, since gravure printing is a kind of intaglio printing in which a mass of an ink contained in a recess part of a printing plate is transferred to a paper surface, a transferred amount of the ink is larger than that in offset printing so that gradation duplicability is good and a printed material giving a rich and voluminous presentation is obtained. With coloration and visualization of magazines in these years, the gravure printing is more and more used.

To make full use of the characteristics of the gravure printing, a coated paper for gravure printing having good compatibility with gravure printing is used. The coated paper for gravure printing is designed so that an omission of ink transfer from each cell of a gravure plate, namely mis dotting in printing is prevented as much as possible, by the improvement of smoothness, cushioning properties, oil-absorbance, and it has far better compatibility with gravure printing than a normal coated paper. But, with increase of the printing speed in these years, a coated paper having better compatibility with-gravure printing is required.

On the other hand, in the production process of a coated paper for gravure printing, it has been tried to coat a sheet of paper at a high speed in order to increase the productivity. With the increase of the coating speed, there arise some problems in the production process such as streaks and bleedings due to flowability or water retention characteristics of a coating liquid and, in addition, the compatibility of the produced coated paper with the gravure printing is decreased. It is highly desired to solve these problems.

In general, a pressure sensitive copying paper comprises an upper paper on a lower surface of which micro-capsules containing an electron-donating colorless or pale color leuco dye dissolved in an organic solvent (a capsule oil) are coated, and a lower paper having, on its upper surface, a color-developing layer containing an electron-accepting color developer. In use, the upper and lower papers are laminated with facing these two coated surfaces each other, and the copying paper is pressurized with a ball pen or a typewriter, whereby the capsules in a pressurized part are broken and the capsule oil containing the leuco dye migrates on the color developing layer so that a color developing reaction takes place and a printed record is made.

Since the printed record made by the pressure sensitive copying paper is more beautiful than that made by a conventional copying method using a carbon paper, and clothes or hands are not made dirt, the pressure sensitive copying paper is widely used. In view of its characteristics, the pressure sensitive copying paper is most widely used as a slip paper, and sometimes several sheets of paper should be copied at one time. In such case, one or more intermediate papers each carrying the color developing layer on the upper surface and the capsule layer on the lower surface are inserted between the upper and lower papers. As the number of the intermediate papers increases, printing pressure or writing pressure which reaches the lower paper decreases so that a coloring property decreases.

Sometimes the pressure sensitive copying paper is used outdoors. In particular, in a cold place in winter, a so-called low temperature initial coloring property just after copying is poor.

For the formation of the color developing layer on the intermediate and lower papers, offset printing is often used. When a bonding strength of the color developing layer to the paper is weak, picking and dusting occur. To solve such problems, it is tried to use a specific latex or a pigment having a specific particle size as disclosed in Japanese Patent Kokai Publication Nos. 24992/1985 and 83093/1986. However, these methods do not necessarily improve the low temperature initial coloring property satisfactorily.

DISCLOSURE OF THE INVENTION

As the results of the extensive study to solve the above problems, it has been found that the problems can be solved by emulsion polymerizing a monomer mixture in the presence of a specific compound, or by adding a monomer mixture containing an aliphatic conjugated diene monomer and thereafter a monomer mixture containing no aliphatic conjugated diene monomer in the emulsion polymerization, or by adding a part of a chain transfer agent after the addition of the monomer mixture, and the present invention has been completed.

DETAILED DESCRIPTION OF THE INVENTION

The present invention will be explained in detail.

Specific examples of the aliphatic conjugated diene monomer are 1,3-butadiene, 2-methyl-1,3-butadiene, 2,3-dimethyl-1,3-butadiene, 2-chloro-1,3-butadiene, substituted straight chain conjugated pentadienes, substituted or branched conjugated hexadienes, and the like. They are used independently or as a mixture thereof. Among them, 1,3-butadiene is preferred.

Examples of ethylenically unsaturated carboxylic acid monomer are mono- or dicarboxylic acids such as acrylic acid, methacrylic acid, crotonic acid, maleic acid, fumaric acid, itaconic acid, and their anhydrides.

Examples of other monomer which can be copolymerized with the above aliphatic conjugated diene monomer and the ethylenically unsaturated carboxylic acid monomer are alkenyl aromatic monomers, unsaturated carboxylic acid alkyl ester monomers, unsaturated monomers having a hydroxyalkyl group, cyanated vinyl monomers, unsaturated carboxylic acid amide monomers, and the like.

Examples of the alkenyl aromatic monomers are styrene, α-methylstyrene, methyl-α-methylstyrene, vinyl-toluene, divinylbenzene and the like. They may be used independently or as a mixture thereof. Among them, styrene is preferred.

Examples of the unsaturated carboxylic acid alkyl ester monomers are methyl acrylate, methyl methacrylate, ethyl acrylate, ethyl methacrylate, butyl acrylate, glycidyl methacrylate, dimethyl fumarate, diethyl fumarate, dimethyl maleate, diethyl maleate, dimethyl itaconate, monomethyl fumarate, monoethylfumarate, 2-ethylhexyl acrylate, and the like. They may be used independently or as a mixture thereof. Among them, methyl methacrylate is preferred.

Examples of the unsaturated monomers having the hydroxyalkyl group are β-hydroxyethyl acrylate, β-hydroxyethyl methacrylate, hydroxypropyl acrylate, hydroxypropyl methacrylate, hydroxybutyl acrylate, hydroxybutyl methacrylate, 3-chloro-2-hydroxypropyl methacrylate, di-(ethyleneglycol)maleate, di-(ethyleneglycol)itaconate, 2-hydroxyethyl maleate, bis(2-hydroxyethyl)maleate, 2-hydroxyethylmethyl fumarate, and the like. They may be used independently or as a mixture thereof. Among them, β-hydroxyethyl acrylate is preferred.

Examples of the cyanated vinyl monomers are acrylonitrile, methacrylonitrile, α-chloroacrylonitrile, α-ethylacrylonitrile, and the like. They may be used independently or as a mixture thereof. Among them, acrylonitrile is preferred.

Examples of the unsaturated carboxylic acid amide monomers are acrylamide, methacrylamide, N-methylolacrylamide, N-methylolmethacrylamide, N,N-dimethylacrylamide, and the like. They Bay be used independently or as a mixture thereof. Among them, acrylamide is preferred.

There is not limitation on the monomer composition. In the inventions of claims 1, 12 and 13, 10 to 80% by weight of the aliphatic conjugated diene monomer, 0.5 to 10% by weight of the ethylenically unsaturated carboxylic acid monomer, and 10 to 89.5% by weight of the other monomer coporimerizable therewith are preferably used.

When an amount of the aliphatic conjugated diene monomer is less than 10% by weight, the bond strength tends to decrease. When this amount exceeds 80% by weight, water resistance tends to decrease.

When an amount of the ethylenically unsaturated carboxylic acid monomer is less than 0.5% by weight, the mechanical stability of the latex decreases. When this amount exceeds 10% by weight, the viscosity of the latex tends to increase.

When an amount of the other copolymerizable monomer is less than 10% by weight, the water resistance tends to decrease. When this amount exceeds 89.5% by weight, the bond strength tends to decrease.

A composition of the copolymer latex to be used as a binder of the composition for gravure printing according to claim 8 comprises 30 to 80% by weight of the aliphatic conjugated diene monomer, 0.5 to 10% by weight of the ethylenically unsaturated carboxylic acid monomer and 10 to 69.5% by weight of the other copolymerizable monomer.

When an amount of the aliphatic conjugated diene monomer is less than 30% by weight, the produced coated paper has poor compatibibility with gravure printing. When this amount exceeds 80% by weight, rolls are contaminated in the super calendering step of the coated paper. When an amount of the ethylenically unsaturated carboxylic acid monomer is less than 0.5% by weight, the mechanical stability of the latex is insufficient. When this amount exceeds 10% by weight, the viscosity of the latex is unpreferably high. When an amount of the other copolymerizable monomer is less than 10% by weight, the rolls are contaminated in the super calendering step of the coated paper. When this amount exceeds 69.5% by weight, the produced coated paper has poor compatibility with gravure printing.

A composition of the copolymer latex to be used as a binder of a pressure sensitive printing paper according to claim 10 comprises 20 to 60% by weight of the aliphatic conjugated diene monomer, 0 to 20% by weight of the cyanated vinyl compound, 1 to 20% by weight of the ethylenically unsaturated carboxylic acid monomer and 0 to 79% by weight of the other copolymerizable monomer.

When an amount of the aliphatic conjugated diene monomer is less than 20% by weight, the bond strength is insufficient. When this amount exceeds 60% by weight, the coloring property is unsatisfactory. When an amount of the cyanated vinyl monomer exceeds 20% by weight, the bond strength decreases unpreferably. When an amount of the ethylenically unsaturated carboxylic acid monomer is less than 1% by weight, the mechanical stability of the latex is insufficient. When this amount exceeds 20% by weight, the bond strength is low. When an amount of the other copolymerizable monomer exceeds 70% by weight, the bond strength decreases. The copolymer latex which is used as the binder of the pressure sensitive copying paper preferably has a gel content of 50 to 100% in view of the coloring property and the printability.

When the process of claim 12 is employed, that is, a part of the chain transfer agent is added after the completion of addition of the monomers, the copolymer latex having the further improved balance between the blister resistance and the bond strength can be prepared.

A ratio of the chain transfer agent which is added after the completion of addition of the monomers to the whole amount of the chain transfer agent is not critical. Preferably, 30% by weight or less of the chain transfer agent is added after the completion of addition of the monomers.

When the process of claim 13 is employed, that is, after the monomer mixture containing the aliphatic conjugated diene monomer (a) is added, the monomer mixture containing no monomer (a) is added, the copolymer latex having the good balance between the bond strength and resistance to the backing roll contamination.

An amount of the monomer mixture containing no monomer (a) is preferably from 3 to 40% by weight based on the whole weight of the monomers.

Examples of the chain transfer agent to be used in the present invention are alkylmercapatans (e.g. n-hexylmercaptan, n-octylmercaptan, tert.-octylmercaptan, n-dodecylmercaptan, tert.-dodecylmercaptan, n-stearylmercaptan, etc.), xanthogen compounds (e.g. dimethylxanthogen disulfide, diisopropylxanthogen disulfide, etc.), α-methylstyrene dimer, terpinolene, thiuram type compounds (e.g. tetramethylthiuram disulfide, tetraethylthiuram disulfide, tetramethylthiuram monosulfide, etc.), phenol compounds (e.g. 2,6-di-tert-butyl-4-methylphenol, styrenated phenol, etc.), allyl compounds (e.g. allylalcohol, etc.), halohydrocarbons (e.g. dichloromethane, dibromomethane, carbon tetrachloride, carbon tetrabromide, etc.), vinyl ethers (e.g. α-benzyloxystyrene, α-benzyloxyacrylonitrile, α-benzyloxyacrylamide, etc.), triphenylethane, pentaphenylethane, acrolein, methacrolein, thioglycolic acid, thiomalic acid, 2-ethylhexyl thioglycolate, and the like. They may be used independently or as a mixture thereof.

An amount of the chain transfer agent is not limited and can be suitably adjusted according to the properties required for the copolymer latex. Preferably, the chain transfer agent is used in an amount of from 0.05 to 10 parts by weight per 100 parts by weight of the monomer mixture.

Most of a cyclic unsaturated hydrocarbon having one unsaturated bond in a ring remains unreacted after the completion of polymerization. For the purpose of recovery of the unreacted compound, preferably the cyclic unsaturated hydrocarbon has a boiling point of not higher than 140° C. Specific examples are cyclopentene, cyclohexene, cycloheptene, 4-methylcyclohexene, 1-methylcyclohexene, and the like. In particular, cyclopentene, cyclohexene and cycloheptene are preferably used.

An amount of the cyclic unsaturated hydrocarbon is from 0.1 to 30 parts by weight per 100 parts by weight of the monomer mixture. When this amount is less than 0.1 part by weight, the effects of the present invention are insufficiently achieved. When this amount exceeds 30 parts by weight, an amount of the cyclic unsaturated hydrocarbon which remains unreacted increases so that a large amount of energy is consumed for the recovery of the hydrocarbon. Preferably, the cyclic unsaturated hydrocarbon is used in an amount of 0.5 to 15 parts by weight, more preferably 1 to 15 parts by weight.

A method for adding the components used in the present invention is not critical. They may be added at one time, portion by portion, or continuously. In the emulsion polymerization, conventionally used emulsifiers, polymerization initiators, electrolytes, polymerization accelerators, chelating agents and the like may be used.

In the present invention, any one of one-stage, two-stage and multistage polymerization processes can be used. In particular, in the inventions of claims 1, 8 and 10, the emulsion polymerization is preferably carried out by the following method.

In the first stage, 3 to 40% by weight, preferably 5 to 30% by weight of the monomer mixture based on the whole monomer mixture is polymerized. When a polymerization conversion reaches 50% or higher, preferably 70% or higher, the rest of the monomer mixture is added and the polymerization is completed.

In the invention of claim 12, the emulsion polymerization is preferably carried out as follows:

In the first stage, 3 to 40% by weight, preferably 5 to 30% by weight of the monomer mixture based on the whole monomer mixture is, or said part of the monomer mixture and a part of the chain transfer agent are polymerized. When a polymerization conversion reaches 50% or higher, the rest of the monomer mixture is, or the rest of the monomer mixture and a part of the chain transfer are added in the second stage polymerization. When the second stage polymerization is completed, the rest of the chain transfer agent is added and polymerization is completed. Thereafter, the polymerization is completed.

In the invention of claim 13, the emulsion polymerization is preferably carried out by the following method.

In the first stage, 3 to 40% by weight of the monomer mixture containing the aliphatic conjugated diene monomer (a) and the ethylenically unsaturated carboxylic acid monomer (b) based on the whole monomer mixture is polymerized. In the second stage, 20 to 94% by weight of the monomer mixture containing the aliphatic conjugated diene monomer (a) based on the whole monomer mixture is added and polymerized. Then, in the third stage, 3 to 40% by weight of the monomer mixture containing no diene monomer (a) is added and polymerized. Thereafter, the polymerization is completed.

Examples of the emulsifier to be used in the present invention are anionic surfactants such as sulfuric acid esters salts, alkylbenzenesulfonic acid salts, alkyldiphenylethersulfonic acid salts, aliphatic sulfonic acid salts or aliphatic carboxylic acid salts of higher alcohols, and sulfuric acid ester salts of nonionic surfactants; and nonionic surfactants such as alkyl esters, alkylphenyl ethers and alkyl ethers of polyethylene glycol. They may be used independently or as a mixture thereof.

Examples of the polymerization initiator are water-soluble initiators (e.g. potassium persulfate, ammonium persulfate, sodium persulfate, etc.), and oil-soluble initiators (e.g. redox initiators, benzoyl peroxide, etc.).

By the above methods, the generation of fine coagulated particles is suppressed, and the copolymer latex having good polymerization stability is obtained. Since the cyclic unsaturated hydrocarbon having one unsaturated bond in the ring is unpreferable for working atmosphere in the final use, the unreacted cyclic unsaturated hydrocarbon is substantially removed, that is, reduced to 0.5 parts by weight or less, preferably 0.1 parts by weight or less per 100 parts by weight of the copolymer latex (solid content) after the preparation of the copolymer latex.

The cyclic unsaturated hydrocarbon can be removed by any of known methods such as steam distillation, vacuum distillation, inert gas blowing, and the like.

In addition, the present invention provides various adhesive compositions comprising the copolymer latex prepared by the above methods.

For example, the copolymer latex can be used as a paper coating composition, an adhesive composition for back-sizing carpets, an adhesive for rock fiber materials, an adhesive composition for tire cords, a wood adhesive composition, or an adhesive composition for leather or skin.

The paper coating composition which relates to the inventions of claims 1, 12 and 13 is prepared in the form of an aqueous dispersion by adding a pigment and other optional binder to the copolymer latex.

In this composition, 2 to 100 parts by weight, preferably 5 to 50 parts by weight of the copolymer latex of the present invention and 0 to 30 parts by weight of other binder are used per 100 parts by weight of the pigment, in terms of the solid content.

Examples of the pigment are inorganic pigments such as kaolin clay, talc, barium sulfate, titanium oxide, calcium carbonate, aluminum hydroxide, zinc oxide, satin white, etc., and organic pigments such as polystyrene latex. They may be used independently or as a mixture thereof.

Examples of the other binder are natural binder materials such as starch, denatured starch (e.g. oxidized starch, esterified starch, etc.), soybean protein, casein, and the like, and synthetic latexes such as polyvinyl alcohol latexes, polyvinyl acetate latexes, acrylic latexes, and the like.

For the preparation of the paper coating composition of the present invention, other auxiliaries such a dispersant (e.g. sodium pyrophosphate, polysodium acrylate, sodium hexametaphosphate, etc.), a foam inhibitor (e.g. polyglycol, aliphatic acid esters, phosphate esters, silicone oils, etc.), a leveling agent (e.g. turkey red oil, dicyanediamide, urea, etc.), a preservative, an agent for imparting water resistance (e.g. formalin, hexamine, melamine resin, urea resin, glyoxal, etc.), a mold releasing agent (e.g. calcium stearate, paraffin emulsion, etc.), a fluorescent dye, a color water-retentivity improver (e.g. carboxymethylcellulose, sodium alginate, etc.) may be added, if necessary.

The paper coating composition of the present invention may be coated on the paper surface by any of conventional methods using a known coater such as an air knife coater, a blade coater, a roll coater, a bar coater, and the like. After coating, the surface is dried and finished by, for example, calendering.

The adhesive composition for back sizing carpets is prepared by adding a filler and/or other additive to the above copolymer latex.

Usually, 0 to 800 parts by weight the filler is used per 100 parts by weight of the copolymer latex in terms of the solid content.

Examples of the filler are calcium carbonate, aluminum hydroxide, hollow glass balloons, clay, talc, silica, carbon blacks and the like. They may be used independently or as a mixture thereof.

Examples of the other additives are a pH adjuster, an emulsifier, a stabilizer, a vulcanizing agent, a vulcanizing accelerator, an anti-aging agent, a dispersant, a foam inhibitor, a preservative, a thickening agent, a colorant, a crosslinking agent, a crosslinking aid, and the like.

To the adhesive composition for rock fiber materials, in addition to the copolymer latex of the present invention, there may be added a filler, an emulsifier, a stabilizer, an antioxidant, a UV-deterioration preventing agent, a vulcanizing agent, a vulcanizing accelerator, a dispersant, a foam inhibitor, a preservative, a thickening agent, a colorant, a crosslinking agent, a crosslinking aid, and the like.

The paper coating composition for gravure printing according to claim 8 is prepared in the form of an aqueous dispersion by adding, to the above copolymer latex, a pigment and optionally other binder, a thickening agent or an auxiliary.

Usually, 3 to 20 parts by weight, preferably 4 to 10 parts by weight of the copolymer latex is used per 100 parts by weight of the pigment in terms of the solid content.

In this composition, the pigment, the other binder, the thickening agent and the auxiliary are the same as described above.

The color-developer composition for a pressure sensitive copying paper according to claim 10 is prepared by adding, to the above copolymer latex, a pigment, a color developer and optionally other thickening agent, an auxiliary, etc.

As the pigment, one or more of pigments coventionally used in the coated paper such as heavy calcium carbonate, precipitated calcium carbonate, kaolin, calcined kaolin, aluminum hydroxide, talk, silica powder, barium sulfide, titanium oxide, satin white, plastic pigments, and the like can be used. They may be used independently or as a mixture thereof.

As the color developer, any of the presently used ones such as clay materials (e.g. acid clay, activated clay, atapaljite, zeolite, bentonite, kaolin, etc.), metal salts of aromatic carboxylic acids, phenyl resins and the like may be used.

Examples of the other thickening agent or binder are water-soluble natural polymers such as proteins (e.g. gelatin, albumin, casein, etc.), starches (e.g. grain starch, α-starch, oxidized starch, etherified starch, esterified starch, etc.), cellulose derivatives (e.g. carboxymethylcellulose, hydroxypropylcellulose, methylcellulose, etc.), and water-soluble synthetic polymers such as polyvinyl alcohol, acrylamide-modified polyvinyl alcohol, polyvinylpyrrolidone, polyacrylic acid, polyacrylamide, maleic acid copolymers, and the like.

Examples of the other auxiliary are a pH adjuster, an emulsifier, a stabilizer, a mold release agent, an anti-aging agent, a dispersant, a foam inhibitor, a preservative, a colorant, a crosslinking agent, a crosslinking aid, and the like.

The copolymer latex is usually used in an amount of 5 to 40 parts by weight per 100 parts by weight of the pigment.

The color developer is usually used in an amount of 5 to 40 parts by weight per 100 parts by weight of the pigment. Preferably, the color developer such as the metal salt of the aromatic carboxylic acid and the phenol resin is prepared as an aqueous dispersion by a ball mill, a sand mill, etc.

The color developer composition for the pressure sensitive copying paper is coated on a suitable, substrate such as a paper, a synthetic paper, a synthetic film, and the like using a conventional coating apparatus such as a blade coater, a roll coater, a bar coater, an air knife coater, a curtain coater, etc.

EXAMPLES

The present invention will be explained in detail by following Examples, which do not limit the scope of the present invention. In Examples, "parts" and "%" are by weight.

The properties are measured by the following methods.
Contamination of a reactor After polymerization, deposits on an inner wall of a polymerization reactor are observed by naked eyes and evaluated according to the following criteria:
○: Very few
Δ: A few
X: Many
Fine coagulated particles Fine coagulated particles having a size of several to 10 μm present in the latex are observed by a microscope and their number is evaluated according to the following criteria:
○: Very few
Δ: A few
X: Many
Gel content A latex film is prepared by drying the latex at room temperature. About one gram of the latex film is precisely weighed and placed in 400 cc of toluene for 48 hours. The solution is filtered through a wire net of 300 mesh and dried. A material (gel) on the wire net which is not dissolved in toluene is weighed and a gel content is calculated.
Polymerization Example 1 of copolymer latex In a 10 liter autoclave, water (100 parts), sodium dodecylbenzenesulfonate (0.3 part), sodium hydrogencarbonate (0.2 part), potassium persulfate (1.0 part), and a monomer mixture, a chain transfer agent and a cyclic unsaturated hydrocarbon having one unsaturated bond in a ring to be used in the first stage as shown in Table 1 or 2 were charged to effect first stage polymerization at 65° C.

When a conversion in the first stage polymerization reached 70%, a monomer mixture, a chain transfer agent and an unsaturated hydrocarbon for the second stage polymerization were continuously charged over 7 hours to effect second stage polymerization. Thereafter, to complete the polymerization, the reaction was continued for further 3 hours. The polymerization conversion was 98% or higher in all cases. After adjusting pH of the obtained copolymer latex at 8 with sodium hydroxide, the unreacted monomer and the unsaturated hydrocarbon were removed by steam distillation to obtain Copolymer Latex Nos. 1 to 13.

In the Tables, the amounts on the left and right sides of the slash "/" are amounts in the first stage and the second stage, respectively.
Preparation of a paper coating composition From each of Copolymer Latex Nos. 1–13, a paper coating composition was prepared according to the following formulation by diluting the latex to a solid content of 60% with water. With the prepared paper coating composition, mechanical stability and flowability were measured.
Formulation
Kaolin clay 80 parts
Calcium carbonate 20 parts
Denatured starch 6 parts
Copolymer latex 12 parts (solid)

On one surface of a commercial high quality paper (64 g/m$^2$), the above composition was coated using a coating bar at a coated amount of 10 g/m$^2$ (one surface) and dried, followed by super calendering at a roll temperature of 50° C. under a linear pressure of 70–80 kg/cm to obtain a coated paper.

With the coated paper, RI wet pick, RI dry pick, blister resistance, printing gloss, and odor were measured.
Mechanical stability The coating composition is kneaded between a metal roll and a rubber roll using a patastabilitester and mechanical shear is applied. Then, a time (minutes) till coagulated particles are formed on the rubber roll is measured.
○: 30 minutes or longer
Δ: From 20 minutes to shorter than 30 minutes.
X: Shorter than 20 minutes
Flowability Using a Hercules high shear viscometer with a pob F, a viscosity of the paper coating composition is measured at 4000 rpm. The smaller viscosity means better flowability.
RI wet pick A degree of picking is observed by naked eyes when a coated paper is printed by an RI printing machine using wetting water and ranked from 1st grade (best) to 5th grade (worst). The grades of six measurements are averaged.
DI dry pick In the same manner as in the measurement of RI wet pick but using no wetting water, the degree of picking is observed and ranked.
Blister resistance A double coated printing paper is moisture conditioned (about 6%) and put in a heated oil bath, and a minimum temperature at which the blister is generated is recorded.
Printing gloss Using the RI printing machine and a commercially available red ink for offset printing, the paper is printed at a constant speed. Gloss of the printed surface is measured according to JIS P-8142. The larger value means better gloss.
Odor A coated paper is prepared by the same method as above except that the coated amount is changed to 20 g/m$^2$ on one surface. From the coated paper, sample pieces each of 10 cm×10 cm are cut out. Three paper sample pieces are charged in a glass bottle. After sealing the bottle, it is kept standing at 50° C. for one hour. The seal is removed and odor is smelled and evaluated according to the following criteria:

X: Smelled.
Δ: Slightly smelled.
○: Hardly smelled.

TABLE 1

| Latex No. | Examples | | | | | | |
|---|---|---|---|---|---|---|---|
| | 1 | 2 | 3 | 4 | 5 | 6 | 7 |
| Butadiene | 3/24 | 2/28 | 5/25 | 4/30 | 2/33 | 4/36 | 7/38 |
| Styrene | 5/42 | 3/47 | 9/50 | 5/42 | 2/34.5 | 4/38 | 5/25 |
| Methyl methacrylate | 1/18 | 1/9 | 0.5/2.5 | —/5 | 2/23 | | 2/8 |
| Acrylonitrile | —/3 | | 0.5/2.5 | 1/9 | | 2/13 | |
| Methacrylonitrile | | 1/4 | | | | | 1/9 |
| β-Hydroxyethyl acrylate | 1/— | | 1/1 | 1/— | 1/— | | 1/— |
| Acrylamide | | 2/— | 1/— | | 1/— | | |
| Fumaric acid | | 2/— | | | 1.5/— | | |
| Itaconic acid | 2/— | | 2/— | 3/— | | 2/— | 4/— |
| Acrylic acid | | 1/— | | | | —/1 | |
| Cyclopentene | 3/— | | | | | | |
| Cyclohexene | | 5/— | 3/— | 2/— | 3/— | 5/3 | |
| Cycloheptene | | | | | 2/— | | 3/— |
| Cyclohexane | | | | | | | |
| α-Methylstyrene dimer | 0.3/— | | | | | 0.3/— | |
| tert.-Dodecylmercaptan | —/0.4 | —/0.6 | 0.1/0.3 | 0.1/0.9 | 0.1/0.4 | 0.1/0.3 | 0.1/0.4 |
| Terpinolene | | | | | | | |
| Contamination of reactor | ○ | ○ | ○ | ○ | ○ | ○ | ○ |
| Fine coagulated particles | ○ | ○ | ○ | ○ | ○ | ○ | ○ |
| Gel content | 35 | 25 | 38 | 49 | 60 | 82 | 78 |

TABLE 2

| Latex No. | Examples | | Comparative Examples | | | |
|---|---|---|---|---|---|---|
| | 8 | 9 | 10 | 11 | 12 | 13 |
| Butadiene | 5/45 | 6/54 | 3/27 | 7/38 | 4/30 | 2/33 |
| Styrene | 4/37 | 3/26 | 6/51 | 6/37 | 5/42 | 2/34.5 |
| Methyl methacrylate | 1/4 | 1/5 | 1/4 | 1/9 | —/5 | 2/23 |
| Acrylonitrile | | —/3 | 1/4 | | 1/9 | |
| Methacrylonitrile | | | | | | |
| β-Hydroxyethyl acrylate | 1/— | | 1/— | | 1/— | 1/— |
| Acrylamide | | | | | | |
| Fumaric acid | 2/— | 1/— | | | | 1.5/— |
| Itaconic acid | | | 2/— | 1/— | 3/— | |
| Acrylic acid | 1/— | 2/— | | 1/— | | |
| Cyclopentene | 2/— | I | | | | |
| Cyclohexene | | 4/— | | | | |
| Cyclohexane | | | | | 2/— | |
| Toluene | | | | | | 6/— |
| α-Methylstyrene dimer | | | | | | |
| tert.-Dodecylmercaptan | 0.1/0.5 | —/0.5 | 0.1/0/6 | 0.1/0.7 | 0.1/1.0 | 0.1/0.5 |
| Terpinolene | | | | | | |
| Contamination of reactor | ○ | ○ | × | × | Δ | Δ |
| Fine coagulated particles | ○ | ○ | × | × | Δ | × |
| Gel content | 78 | 85 | 48 | 83 | 59 | 69 |

TABLE 3

| Latex No. | Examples | | | | | | | | | Comparative Ex. | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Coating composition | | | | | | | | | | | | | |
| Mechanical stability | ○ | ○ | ○ | ○ | ○ | ○ | ○ | ○ | ○ | × | × | Δ | Δ |
| Flowability (cps) | 45 | 51 | 53 | 48 | 44 | 48 | 50 | 48 | 47 | 61 | 65 | 58 | 57 |
| Coated paper properties | | | | | | | | | | | | | |
| RI dry pick | 3.2 | 2.9 | 2.5 | 2.0 | 1.8 | 1.5 | 1.3 | 1.3 | 1.2 | 3.3 | 2.2 | 2.2 | 2.1 |
| Blister resistance | 245 | 255 | 240 | 225 | 215 | 205 | 210 | 210 | 200 | 215 | 195 | 210 | 205 |

TABLE 3-continued

| Latex No. | Examples | | | | | | | | | Comparative Ex. | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| (°C.) | | | | | | | | | | | | | |
| RI wet pick | 1.8 | 1.5 | 1.2 | 1.8 | 2.2 | 2.0 | 3.1 | 3.1 | 3.4 | 2.3 | 3.5 | 2.2 | 2.8 |
| Odor | ○ | ○ | ○ | ○ | ○ | ○ | ○ | ○ | ○ | × | × | × | Δ |
| Printing gloss (%) | 80 | 83 | 80 | 84 | 82 | 84 | 82 | 81 | 82 | 77 | 75 | 78 | 79 |

Polymerization Example 2 of copolymer latex

In a 10 liter autoclave, water (100 parts), sodium dodecylbenzenesulfonate (0.6 part), sodium hydrogencarbonate (0.3 part), potassium persulfate (0.8 part), and a monomer mixture, a chain transfer agent and a cyclic unsaturated hydrocarbon having one unsaturated bond in a ring to be used in the first stage as shown in Table 4 were charged to effect first stage polymerization at 60° C.

When a conversion in the first stage polymerization reached 75%, a monomer mixture, a chain transfer agent and an unsaturated hydrocarbon for the second stage polymerization were continuously charged over 6 hours to effect second stage polymerization at 70° C. Thereafter, to complete the polymerization, the reaction was continued for further 3 hours. The polymerization conversion was 98% or higher in all cases. After adjusting pH of the obtained copolymer latex at 8 with sodium hydroxide, the unreacted monomer and the unsaturated hydrocarbon were removed by steam distillation to obtain Copolymer Latex Nos. 14 to 20.

Preparation of an adhesive composition for back-sizing carpets pH of each of Copolymer Latex Nos. 14-20 was adjusted at 8.5 with an aqueous solution of sodium hydroxide. To 100 parts (solid) of each of the pH-adjusted latexes, Aron T-40 (manufactured by Toa Gosei Co., Ltd., low molecular weight polysodium acrylate) (1.0 part) and heavy calcium carbonate (400 parts) were added as the dispersants and further Aron A-20P (manufactured by Toa Gosei Co., Ltd., high molecular weight polysodium acrylate) (1.0 part) was added as a thickening agent. Then, a solid content was adjusted at 75% with ion-exchanged water to obtain an adhesive composition for back-sizing carpets having a viscosity of 17,000 to 20,000 cps (measured by a BM type rotational viscometer, 12 rpm, #4 rotor, 20° C.).

The prepared adhesive composition was uniformly coated at an apparent weight of 1200 g/m² on a back surface of a tufted carpet fabric comprising a base fabric of polypropylene split yarn and piles of 6-Nylon having a ⅛ inch gauge. On the coated adhesive composition, a lining material made of a jute woven fabric having a weight of 7 ounces per square yard was adhered and dried at 120° C. for 20 minutes to obtain a carpet lined with the jute fabric.

With the obtained carpet, a bond strength was measured according to JIS 102111.

After the obtained carpet was dipped in ion-exchanged water at 20° C. for one hour the bond strength was measured according to JIS 102111.

A sample of 10 cm×10 cm was cut out and charged in a glass bottle. After sealing the glass bottle, it was kept standing at 50° C. for one hour. Then, the seal was removed and odor was smelled and evaluated according to the following criteria:

○: Hardly smelled.

Δ: Slightly smelled.

X: Smelled.

The results are shown in FIG. 5.

TABLE 4

| Latex No. | Examples | | | | | Comparative Ex. | |
|---|---|---|---|---|---|---|---|
| | 14 | 15 | 16 | 17 | 18 | 19 | 20 |
| Butadiene | 16/24 | 15/35 | 9/51 | 12/48 | 14/56 | 13/35 | 9/51 |
| Styrene | 22/35 | 13/29.5 | 5/28 | 5/22 | 5/22 | 13/29.5 | 5/22 |
| Methyl methacrylate | | 2/3 | | | | 2/3 | |
| Acrylonitrile | | | 1/4 | 2/8 | | | 2/8 |
| β-Hydroxyethyl acrylate | —/1 | 0.5/— | | | —/1 | 0.5/— | |
| Fumaric acid | 2/— | | | 2/— | 1/— | 2/— | 1/— |
| Acrylic acid | | 1/1 | | —/1 | 1/— | | —/1 |
| Itaconic acid | | | 2/— | | | | |
| Cyclopentene | 5/— | | | | | | |
| Cyclohexene | | 6/4 | 4/— | 6/— | 2/— | | |
| α-Methylstyrene dimer | 0.3/— | | | | | | |
| n-Dodecylmercaptan | | 0.3/— | 0.1/— | 0.1/— | 0.2/— | 0.3/— | 0.2/— |
| tert.-Dodecylmercaptan | —/0.4 | —/0.4 | 0.1/0.6 | —/0.7 | —/0.5 | —/0.3 | —/1.0 |
| Contamination of reactor | ○ | ○ | ○ | ○ | ○ | Δ | × |
| Fine coagulated particles | ○ | ○ | ○ | ○ | ○ | × | × |
| Gel content | 50 | 52 | 58 | 62 | 67 | 72 | 63 |

TABLE 5

| Latex No. | Examples | | | | | Comp. Ex. | |
|---|---|---|---|---|---|---|---|
| | 14 | 15 | 16 | 17 | 18 | 19 | 20 |
| Initial peel strength (kg/5 cm) | 3.9 | 4.0 | 4.1 | 4.0 | 4.2 | 3.7 | 3.8 |

TABLE 5-continued

|  | Examples | | | | | Comp. Ex. | |
|---|---|---|---|---|---|---|---|
| Latex No. | 14 | 15 | 16 | 17 | 18 | 19 | 20 |
| Initial fiber extraction strength (kg/5 cm) | 3.4 | 3.4 | 3.5 | 3.3 | 3.7 | 2.8 | 2.7 |
| Peel strength after water immersion (kg/5 cm) | 2.3 | 2.1 | 2.1 | 2.2 | 2.0 | 1.8 | 1.9 |
| Fiber extraction strength after water immersion (kg/5 cm) | 2.9 | 2.9 | 2.8 | 2.9 | 2.7 | 2.2 | 2.2 |
| Odor | ○ | ○ | ○ | ○ | ○ | Δ | × |

Polymerization Example 3 of copolymer latex

In a 20 liter autoclave, water (100 parts), sodium dodecylbenzenesulfonate (0.8 part), sodium hydrogencarbonate (0.3 part), potassium persulfate (0.9 part), and a monomer mixture, a chain transfer agent and a cyclic unsaturated hydrocarbon having one unsaturated bond in a ring to be used in the first stage as shown in Table 6 were charged to effect first stage polymerization at 65° C.

When a conversion in the first stage polymerization reached 80%, a monomer mixture, a chain transfer agent and an unsaturated hydrocarbon for the second stage polymerization were continuously charged over 8 hours to effect second stage polymerization. Thereafter, to complete the polymerization, the reaction was continued for further 3 hours. The polymerization conversion was 98% or higher in all cases. After adjusting pH of the obtained copolymer latex at 8 with sodium hydroxide, the unreacted monomer and the unsaturated hydrocarbon were removed by steam distillation to obtain Copolymer Latex Nos. 21 to 26.

Preparation of an adhesive composition for rock fiber materials

To 100 parts (solid) of each of Copolymer Latex Nos. 21–26, zinc white (2 parts), zinc dibutyldithiocarbamate (1 part) and Antigen S (styrenated phenol manufactured by Sumitomo Chemical Co., Ltd.) (1 part) were added, followed by addition of carboxymethylcellulose (0.3 part) as a thicknening agent. A solid content was adjusted at 48.0% with ion-exchanged water to obtain an adhesive composition for rock fiber materials having a viscosity of 1000 to 1300 cps (measured by a BM type rotational viscometer, 60 rpm, #3 rotor, 20° C.).

The prepared adhesive composition was diluted with ion-exchanged water to lower the solid content to 40.0%, and the diluted composition was spray coated in an amount of about 2 g on a surface of a palm rock fiber material having a length of 100 mm, a width of 100 mm, a thickness of 20 mm and a weight of 3.0 g and dried at 80° C. for 10 minutes.

The back surface of the fiber material was also spray coated and dried at 80° C. for 10 minutes. Then, the coated fiber material was heated at 130° C. for 15 minutes to effect crosslinking to obtain a rock fiber sample.

With the rock fiber sample, bond strength and water resistance of bond strength were measured. The results are shown in Table 6.

The bond strength was measured using an Instron tensile tester.

The bond strength after immersion was measured using the Instron tensile tester after immersing the sample in ion-exchanged water at 20° C.

TABLE 6

|  | Examples | | | | Comparative Ex. | |
|---|---|---|---|---|---|---|
| Latex No. | 21 | 22 | 23 | 24 | 25 | 26 |
| Butadiene | 2/18 | 4/21 | 5/40 | 8/42 | 5/40 | 8/47 |
| Styrene | 7/59.5 | 10/57 | 3/30 | 7/39.5 | 4/39 | 6/35.5 |
| Methyl methacrylate | 1/9 | 0.5/4.5 | 2/18 |  | 1/9 |  |
| Hydroxyethyl acrylate | 1/— | —/1 |  | 1/— |  | 1/— |
| Itaconic acid | 1/— |  |  | 1/— |  | 1/— |
| Fumaric acid |  |  | 2/— |  | 2/— |  |
| Acrylic acid | 1.5/— | 2/— |  | 1.5/— |  | 1.5/— |
| Cyclopentene | 3/— |  |  |  |  |  |
| Cyclohexene |  | 5/5 | 5/— | 4/— |  |  |
| Cyclohexane |  |  |  |  | 5/— |  |
| tert.-Dodecylmercaptan | —/0.4 | 0.1/0.3 | 0.1/0.8 | 0.2/1.0 | 0.1/0.9 | 0.1/1.2 |
| Contamination of reactor | ○ | ○ | ○ | ○ | Δ | × |
| Fine coagulated particles | ○ | Δ | ○ | ○ | × | × |
| Gel content | 62 | 55 | 45 | 40 | 59 | 55 |
| Bond strength (kg/cm$^2$) | 3.5 | 3.1 | 3.3 | 3.9 | 2.7 | 2.6 |
| Bond strength after immersion (kg/cm$^2$) | 2.6 | 2.8 | 2.7 | 2.4 | 2.1 | 1.6 |

The invention of claim 8 will be explained in detail.

Water retentivity

A paper coating composition is coated on a commercial high quality paper with a wire rod bar. Starting from just after coating ("0" second), a time at which water and gloss disappear from a surface of the coated layer is measured. This time is used as a measure of water retentivity. The longer time means better water retentivity.

Compatibility with gravure printing

Using a gravure printing machine of the Printing Laboratory of the Ministry of Finance type and a mesh dot gravure plate, printing is carried out. The number of misdottings of a half tone is counted and ranked from A (Excellent) to D (Bad).

Preparation of copolymer latex

In a 20 liter autoclave, water (100 parts), sodium dodecylbenzenesulfonate (0.4 part), sodium hydrogencarbonate (0.3 part), potassium persulfate (1.0 part), and a monomer mixture, a chain transfer agent and a cyclic unsaturated hydrocarbon having one unsaturated bond in a ring to be used in the first stage as shown in Table 7 or 8 were charged to effect first stage polymerization at 70° C.

When a conversion in the first stage polymerization reached 70%, a monomer mixture, a chain transfer agent and an unsaturated hydrocarbon for the second stage polymerization were continuously charged over 6 hours to effect second stage polymerization. Thereafter, to complete the polymerization, the reaction was continued and terminated when the conversion reached 97%. After adjusting pH of the obtained copolymer latex at 8 with sodium hydroxide, the unreacted monomer and the unsaturated hydrocarbon were removed by steam distillation to obtain Copolymer Latex Nos. 27 to 37.

hot air drier at 140° C. After moisture conditioning, the paper was super calendered to obtain a coated paper.

The compatibility of the coated paper with gravure coating is shown in Tables 9 and 10.

TABLE 7

| | Examples | | | | | | |
|---|---|---|---|---|---|---|---|
| Latex No. | 27 | 28 | 29 | 30 | 31 | 32 | 33 |
| Butadiene | 5/40 | 7/41 | 8/42 | 15/45 | 6/54 | 3/57 | 11/59 |
| Styrene | 4/37 | 5/32 | 5/25 | 8/28 | 3/24 | 1/26 | 3/19 |
| Methyl methacrylate | 1/9 | 1/9 | 1/9 | 1/4 | 1/4 | 1/9 | 1/4 |
| Acrylonitrile | | | —/5 | | | | |
| Methacrylonitrile | | | | | | 1/9 | |
| β-Hydroxyethyl acrylate | 1/— | —/2 | | —/1 | | 1/— | |
| Acrylamide | | | 2/— | 1/— | | | |
| Itaconic acid | 2/— | | 2/— | 3/— | 2/— | 2/— | 2/— |
| Fumaric acid | | 2/— | | | | | 1/— |
| Methacrylic acid | | | 1/— | | —/2 | | |
| Acrylic acid | 1/— | 1/— | | | | | |
| Cyclopentene | 2/— | | | | | | 2/— |
| Cyclohexene | | 3/— | 4/2 | | 2/— | 4/— | |
| Cycloheptene | | | | 2/— | | | |
| Cyclohexane | | | | | | | |
| α-Methylstyrene dimer | | | | 0.5/— | | | |
| tert.-Dodecylmercaptan | —/0.5 | —/0.3 | 0.1/0.3 | —/0.3 | 0.2/0.8 | —/0.5 | —/0.9 |
| n-Doclecylmercaptan | | 0.2/— | | | | 0.1/— | 0.2/— |
| Fine coagulated particles | O 0 | O | O | O | O | O | O |
| Gel content (%) | 87 | 88 | 91 | 90 | 85 | 87 | 82 |

In the Tables, the amounts on the left and right sides of the slash "/" are amounts in the first stage and the second stage, respectively.

Preparation Example 1 of paper coating composition

From each of Copolymer Latex Nos. 27, 28, 29, 34 and 35, a paper coating composition was prepared according to the following formulation by diluting the latex to a solid content of 60% with water. With the prepared paper coating composition, flowability and water retention were measured. The results are shown in Table 9.

Formulation
 No. 1 kaolin 80 parts
 Heavy calcium carbonate 20 parts
 Dispersant 0.5 part
 Sodium hydroxide 0.2 part
 Copolymer latex 8 parts
 Thicknening agent 0.5 part
 (Solid content: 60%)

Preparation Example 1 of paper coating composition

From each of Copolymer Latex Nos. 30–33, 36 and 37, a paper coating composition was prepared according to the following formulation by diluting the latex to a solid content of 63% with water. With the prepared paper coating composition, flowability and water retention were measured. The results are shown in Table 10.

Formulation
 No. 1 kaolin 80 parts
 Heavy calcium carbonate 20 parts
 Dispersant 0.5 part
 Sodium hydroxide 0.2 part
 Copolymer latex 6.5 parts
 Oxidized starch 2 parts
 (Solid content: 63%)

Preparation of coated paper for gravure printing.

On each surface of a commercial high quality paper (64 g/m²), the above composition was coated using a coating bar at a coated amount of 13 g/m² (one surface) and dried by a

TABLE 8

| | Comparative Examples | | | |
|---|---|---|---|---|
| Latex No. | 34 | 35 | 36 | 37 |
| Butadiene | 3/22 | 8/42 | 9/51 | 9/51 |
| Styrene | 6/56 | 6/30 | 5/26 | 5/26 |
| Methyl methacrylate | 1/9 | 1/4 | 1/4 | 1/4 |
| Acrylonitrile | | —/5 | | |
| Methacrylonitrile | | | | |
| β-Hydroxyethyl acrylate | 1/— | 1/— | 1/— | 1/— |
| Acrylamide | | | | |
| Itaconic acid | 2/— | 2/— | 1/— | 2/— |
| Fumaric acid | | | 1/— | |
| Methacrylic acid | | | | |
| Acrylic acid | | | 1/— | 1/— |
| Cyclopentene | | | | |
| Cyclohexene | 4/— | | | |
| Cycloheptene | | | | |
| Cyclohexane | | | | 2/— |
| α-Methylstyrene dimer | | 0.3/— | | |
| tert.-Dodecylmercaptan | —/0.3 | —/0.6 | 0.2/1.2 | —/0.5 |
| n-Dodecylmercaptan | | | | |
| Fine coagulated particles | O | Δ | × | Δ |
| Gel content (%) | 85 | 88 | 86 | 87 |

TABLE 9

| | Examples | | | | C. Ex. |
|---|---|---|---|---|---|
| Latex No. | 27 | 28 | 29 | 34 | 35 |
| Flowability (cps) | 45 | 45 | 47 | 46 | 51 |
| Water retention (sec.) | 13 | 13 | 14 | 13 | 9 |

TABLE 9-continued

|  | Examples | | | C. Ex. | |
|---|---|---|---|---|---|
| Latex No. | 27 | 28 | 29 | 34 | 35 |
| Compatibility with gravure printing | A | A | A | C | B |

TABLE 10

|  | Examples | | | | C. Ex. | |
|---|---|---|---|---|---|---|
| Latex. No. | 30 | 31 | 32 | 33 | 36 | 37 |
| Flowability (cps) | 48 | 47 | 46 | 47 | 54 | 54 |
| Water retention (sec.) | 14 | 13 | 13 | 14 | 10 | 11 |
| Compatibility with gravure printing | B | B | B | B | B | B |

The invention of claim 10 will be explained in detail.

Color developing property

In an atmosphere at 5° C., a commercially available upper paper and a lower paper prepared according to the present invention are laminated and pressed under a super calendering pressure to develop the color over the whole surface, and a change of whiteness with time is measured. The lower value indicates a good color developing property.

Polymerization Example of copolymer latex

In a 20 liter autoclave, water (100 parts), sodium dodecylbenzenesulfonate (0.4 part), sodium hydrogencarbonate (0.3 part), potassium persulfate (1.0 part), and a monomer mixture, a chain transfer agent and a cyclic unsaturated hydrocarbon having one unsaturated bond in a ring to be used in the first stage as shown in Table 11 or 12 were charged to effect first stage polymerization at 70° C.

When a conversion in the first stage polymerization reached 70%, a monomer mixture, a chain transfer agent and an unsaturated hydrocarbon for the second stage polymerization were continuously charged over 6 hours to effect second stage polymerization. Thereafter, to complete the polymerization, the reaction was continued and terminated when the conversion reached 97%. After adjusting pH of the obtained copolymer latex at 5 with sodium hydroxide, the unreacted monomer and the unsaturated hydrocarbon were removed by steam distillation to obtain Copolymer Latex Nos. 38 to 47.

In the Tables, the amounts on the left and right sides of the slash "/" are amounts in the first stage and the second stage, respectively.

TABLE 11

|  | Examples | | | | |
|---|---|---|---|---|---|
| Latex No. | 38 | 39 | 40 | 41 | 42 |
| Butadiene | 3/27 | 6/36 | 6/44 | 3/22 | 3/27 |
| Styrene | 5/45 | 5/32 | 5/24 | 6/47 | 6/47 |
| Methyl methacrylate | 1/9 | 1/5 | 1/4 | 2/18 | 1/9 |
| Acrylonitrile | —/7 | 2/10 | 2/13 |  | 0.5/4 |
| Itaconic acid | 2/— |  |  | 2/— | 2/— |
| Fumaric acid |  | 2/— |  |  | 1.5/— |
| Acrylic acid | 1/— | 1/— |  | 1/— |  |
| Methacrylic acid |  |  | 1/— |  |  |
| Cyclohexene | 2/— | 5/— | 3/2 | 3/— | 3/— |
| Cyclohexane |  |  |  |  |  |
| tert.-Dodecylmercaptan | 0.1/0.1 | 0.1/0.2 | 0.1/0.1 | 0.1/0.1 | 0.1/0.5 |
| Gel content (%) | 88 | 85 | 91 | 82 | 63 |

TABLE 12

|  | Examples | | Comparative Examples | | |
|---|---|---|---|---|---|
| Latex No. | 43 | 44 | 45 | 46 | 47 |
| Butadiene | 4/31 | 3/30 | 3/27 | 9/61 | 2/13 |
| Styrene | 4/31 | 4/44 | 5/45 | 2/15 | 9/63 |
| Methyl methacrylate | 2/13 | 1/4 | 1/9 |  | 1/4 |
| Acrylonitrile | 1/4 | 2/10 | —/7 | 1/9 | 1/4 |
| Itaconic acid |  |  | 2/— | 3/— | 3/— |
| Fumaric acid |  | 1/— |  |  |  |
| Acrylic acid | 2/8 | 1/1 | 1/1 |  |  |
| Methacrylic acid |  |  |  |  |  |
| Cyclohexene | 3/— | 3/— |  | 5/— | 2/— |
| Cyclohexane |  |  | 2/— |  |  |
| tert.-Dodecylmercaptan | 0.1/0.2 | 0.1/0.7 | 0.1/— | 0.1/0.5 | 0.1/0.1 |
| Gel content (%) | 81 | 52 | 93 | 84 | 77 |

Preparation of color developing composition

A color developing composition was prepared according to the following formulation. The color developer (phenol resin) was beforehand treated in a ball mill for 24 hours and used.

Formulation
  Heavy calcium carbonate 100 parts (dry)
  Color developer (phenol resin) 20 parts
  Polyvinyl alcohol 5 parts
  Oxidized starch 10 parts
  Latex 10 parts
  (Solid content: 50%)

Preparation of lower paper

On one surface of a commercial high quality paper (64 g/m$^2$), the above composition was coated using a wire bar and immediately dried in an oven at 100° C. The coated paper was moisture conditioned overnight to obtain a lower paper. With the obtained lower paper, the color developing property, RI Dry Pick and RI Wet Pick were evaluated.

The results are shown in Table 13.

TABLE 13

|  | Examples | | | | | Comparative Examples | | | | |
|---|---|---|---|---|---|---|---|---|---|---|
| Latex No. | 38 | 39 | 40 | 41 | 42 | 43 | 44 | 45 | 46 | 47 |
| Color developing property (Blue) |  |  |  |  |  |  |  |  |  |  |
| 30 Seconds | 28.4 | 30.6 | 31.7 | 30.7 | 30.2 | 27.9 | 32.3 | 34.4 | 44.5 | 29.6 |
| 60 Seconds | 26.4 | 27.3 | 28.6 | 27.5 | 27.0 | 25.8 | 29.7 | 31.9 | 41.0 | 26.6 |
| One day | 18.1 | 18.7 | 18.6 | 18.8 | 18.3 | 17.5 | 19.4 | 21.2 | 23.8 | 18.3 |
| RI Dry Pick | 4.5 | 5.0 | 5.0 | 4.0 | 4.2 | 4.5 | 3.8 | 2.5 | 3.0 | 1.0 |
| RI Wet Pick | 4.5 | 4.3 | 4.0 | 4.2 | 5.0 | 4.0 | 4.0 | 2.0 | 1.5 | 1.0 |

The invention of claim 12 will be explained in detail.
Polymerization Example of copolymer latex In a 10 liter autoclave, water (100 parts), sodium dodecylbenzenesulfonate (0.4 part), sodium hydrogencarbonate (0.3 part), potassium persulfate (1.0 part), and a monomer mixture, a chain transfer agent and a cyclic unsaturated hydrocarbon having one unsaturated bond in a ring to be used in the first stage as shown in Table 14 or 15 were charged to effect first stage polymerization at 65° C.

When a conversion in the first stage polymerization reached 65%, a monomer mixture, a chain transfer agent and an unsaturated hydrocarbon for the second stage polymerization were continuously charged over 7 hours to effect second stage polymerization. After the addition of the monomer mixture for the second stage, a chain transfer agent and an unsaturated hydrocarbon were continuously added over 2 hours and the polymerization was continued till the conversion reached 97%. After adjusting pH of the obtained copolymer latex at 8 with sodium hydroxide, the unreacted monomer and the unsaturated hydrocarbon were removed by steam distillation to obtain Copolymer Latex Nos. 48 to 56.

In the Tables, the amounts on the left, middle and right sides of the slashes "//" are amounts in the first stage, in the second stage and after the second stage, respectively.

Preparation Example (I) of paper coating composition

From each of Copolymer Latex Nos. 48, 49, 50 and 55, a paper coating composition was prepared according to the following formulation by diluting the latex to a solid content of 62% with water to obtain a paper coating composition.

Formulation I

Kaolin clay 80 parts

Heavy calcium carbonate 20 parts

Denatured starch 5 parts

Copolymer latex 12 parts (solid)

(Solid content: 62%)

On each surface of a commercial high quality paper (64 g/m²), the above composition was coated using a coating bar at a coated amount of 13 g/m² (one surface) and dried, followed by super calendering at a roll temperature of 50° C. under a linear pressure of 70–80 kg/cm to obtain a coated paper.

With the prepared coated paper, RI Wet Pick, RI Dry Pick and the blister resistance were measured.

Preparation Example (II) of paper coating composition

From each of Copolymer Latex Nos. 51–54 and 56, a paper coating composition was prepared according to the following formulation by diluting the latex to a solid content of 62% with water to obtain a paper coating composition.

Formulation II

Kaolin clay 60 parts

Heavy calcium carbonate 40 parts

Denatured starch 6 parts

Copolymer latex 10 parts (solid)

(Solid content: 62%)

On each surface of a commercial high quality paper (64 g/m²), the above composition was coated using a coating bar at a coated amount of 10 g/m² (one surface) and dried, followed by super calendering at a roll temperature of 50° C. under a linear pressure of 70–80 kg/cm to obtain a coated paper.

With the prepared coated paper, RI Wet Pick, RI Dry Pick and the antiblister property were measured.

The results are shown in Table 16.

TABLE 14

| Latex No. | Examples | | | | | |
|---|---|---|---|---|---|---|
| | 48 | 49 | 50 | 51 | 52 | 53 |
| Butadiene | 3/27/— | 5/30/— | 5/30/— | 4/36 | 4/36/— | 4/44/— |
| Styrene | 4/32/— | 6/32/— | 6/32/— | 4/37/— | 4/37/— | 3/31/— |
| Methyl methacrylate | 2/18/— | 2/13/— | 2/13/— | —/5/— | —/5/— | 1/9/— |
| Acrylonitrile | | 2/6/— | 2/6/— | 1/9/— | 1/9/— | —/3/— |
| Methacrylonitrile | 1/9/— | | | | | |
| β-Hydroxyethyl acrylate | 1/—/— | | | —/1/— | —/1/— | 2/—/— |
| Acrylamide | | —/1/— | —/1/— | | | |
| Fumaric acid | 1/—/— | | | 2/—/— | 2/—/— | |
| Itaconic acid | | 2/—/— | 2/—/— | | | |
| Acrylic acid | 2/—/— | | | 1/—/— | 1/—/— | —/1/— |
| Methacrylic acid | | —/1/— | —/1/— | | | |
| Cyclopentene | 4/—/— | | | | | |
| Cyclohexene | | 3/2/— | 3/2/2 | 6/—/2 | 6/—/2 | 4/—/— |
| Cycloheptene | | | | | | |
| Cyclohexane | | | | | | |
| tert.-Dodecylmercaptan | 0.05/0.5/0.05 | 0.1/0.7/0.1 | 0.1/0.7/0.1 | —/0.9/0.1 | —/0.9/0.1 | —/0.5/0.1 |
| α-Methylstyrene dimer | | | | | | 0.3/—/— |

TABLE 15

| Latex No. | Examples | | Comp. Examples |
|---|---|---|---|
| | 54 | 55 | 56 |
| Butadiene | 5/47/— | 5/30/— | 4/36/— |
| Styrene | 6/29/— | 6/32/— | 4/37/— |
| Methyl methacrylate | 1/2/— | 2/13/— | —/5/— |
| Acrylonitrile | 1/4/— | 2/6/— | 1/9/— |
| Methacrylonitrile | | | |
| β-Hydroxyethyl acrylate | 1/1/— | | —/1/— |
| Acrylamide | | —/1/— | |
| Fumaric acid | | | 2/—/— |
| Itaconic acid | 3/—/— | 2/—/— | |
| Acrylic acid | | | 1/—/— |
| Methacrylic acid | | —/1/— | |
| Cyclopentene | | | |
| Cyclohexene | | | |
| Cycloheptene | 3/—/2 | | |
| Cyclohexane | | | 6/2/— |
| tert.-Dodecylmercaptan | 0.05/1.0/0.3 | 0.1/0.7/0.1 | —/0.9/0.1 |
| α-Methylstyrene dimer | | | |

TABLE 16

|  | Examples | | | C. E. | Examples | | | | C. E. |
| --- | --- | --- | --- | --- | --- | --- | --- | --- | --- |
| Latex No. | 48 | 49 | 50 | 55 | 51 | 52 | 53 | 54 | 56 |
| Formulation | I | I | I | I | II | II | II | II | II |
| RI Dry Pick | 1.0 | 1.0 | 1.0 | 1.0 | 1.0 | 1.0 | 1.0 | 1.0 | 1.5 |
| RI Wet Pick | 1.0 | 1.0 | 1.0 | 4.0 | 1.0 | 1.0 | 1.0 | 1.5 | 2.0 |
| Blister resistance (°C.) | 240 | 230 | 235 | 200 | 235 | 230 | 225 | 220 | 205 |

When a copolymer latex was prepared in the same manner as in the preparation of Latex No. 49 except that the chain transfer agent to be added after the second stage was used in the second stage and no chain transfer agent was added after the addition of the monomer mixture in the second stage, its blister resistance and RI Wet Pick were inferior to those of Latex No. 49.

The invention of claim 13 will be explained in detail.
Anticontamination of backing roll A coated paper sample (without supercalendering) is laminated on a polyester film with facing the coated surface to the polyester film and heat pressed by a heat roll heated at 120° to 130° C. under pressure of 200 kg. A degree of contamination on the polyester film is observed and ranked from 1.0 (good and little contamination) to 5.0 (Bad and heavy contamination).

Polymerization Example of copolymer latex

In a 10 liter autoclave, water (100 parts), sodium dodecylbenzenesulfonate (0.4 part), sodium hydrogencarbonate (0.3 part), potassium persulfate (1.0 part), and a monomer mixture, a chain transfer agent and a cyclic unsaturated hydrocarbon having one unsaturated bond in a ring to be used in the first stage as shown in Table 17 were charged to effect first stage polymerization at 65° C.

When a conversion in the first stage polymerization reached 70%, a monomer mixture, a chain transfer agent and an unsaturated hydrocarbon for the second stage polymerization were continuously charged over 6 hours to effect second stage polymerization. Thereafter, a monomer mixture and a chain transfer agent for the third stage polymerization were continuously charged over one hour to effect the third stage polymerization. To complete the polymerization, the reaction was continued and terminated when the conversion reached 98%. After adjusting pH of the obtained copolymer latex at 8 with sodium hydroxide, the unreacted monomer and the unsaturated hydrocarbon were removed by steam distillation to obtain Copolymer Latex Nos. 57 and 58.

In the preparation of Copolymer Latex No. 59, the polymerization was carried out in the same manner as in the preparation of Copolymer Latex No. 58 except that cyclohexane was used in place of cyclohexene.

In the Tables, the amounts on the left, middle and right sides of the slashes "//" are amounts in the first stage, in the second stage and after the second stage, respectively.

Preparation Example (I) of paper coating composition

From Copolymer Latex No. 57, a paper coating composition was prepared according to the following formulation by diluting the latex to a solid content of 62% with water.

Formulation I
  Kaolin clay 80 parts
  Heavy calcium carbonate 20 parts
  Denatured starch 5 parts
  Copolymer latex 12 parts (solid)
  (Solid content: 62%)

On each surface of a commercial high quality paper (64 g/m$^2$), the above composition was coated using a coating bar at a coated amount of 13 g/m$^2$ (one surface) and dried with the prepared coated paper, the anticontamination of backing roll was evaluated.

After super calendering the coated paper at a roll temperature of 50° C. under a linear pressure of 70–80 kg/cm to obtain a coated paper, and its RI Dry Pick was measured.

Preparation Example (II) of paper coating composition

From each of Copolymer Latex Nos. 58 and 59, a paper coating composition was prepared according to the following formulation by diluting the latex to a solid content of 62% with water.

Formulation II
  Kaolin clay 60 parts
  Heavy calcium carbonate 40 parts
  Denatured starch 6 parts
  Copolymer latex 10 parts (solid)
  (Solid content: 62%)

On each surface of a commercial high quality paper (64 g/m$^2$), the above composition was coated using a coating bar at a coated amount of 13 g/m$^2$ (one surface) and dried With the prepared coated paper, the anticontamination of backing roll was evaluated.

After super calendering the coated paper at a roll temperature of 50° C. under a linear pressure of 70–80 kg/cm to obtain a coated paper, and its RI Dry Pick was measured.

The results are shown in Table 18.

When a copolymer latex was prepared in the same manner as in the preparation of Latex No. 57 except that the monomer mixture to be added after the second stage was used in the first or second stage, it had inferior RI Dry Pick and anticontamination of backing roll to Latex No. 57.

TABLE 17

|  | Examples | | C. Ex. |
| --- | --- | --- | --- |
| Latex No. | 57 | 58 | 59 |
| Butadiene | 5/25/— | 5/35/— | 4/35/— |
| Styrene | 7/33/5 | 3/25/7 | 3/35/— |
| Methyl methacrylate | 1/4/10 | 1/6/3 | 1/6/3 |
| Acrylonitrile | 1/4/— | 1/8/1 | 1/8/1 |
| β-Hydroxyethyl acrylate | 1/1/— | 2/—/— | 2/—/— |
| Acrylamide | 1/—/— | | |
| Fumaric acid | 2/—/— | | |
| Itaconic acid | | 2/—/— | 2/—/— |
| Acrylic acid | —/1/— | | |
| Methacrylic acid | | —/—/1 | —/—/1 |
| Cyclopentene | 4/—/— | | |
| Cyclohexene | | 6/—/— | |
| Cyclohexane | | | 6/—/— |
| tert.-Dodecylmercaptan | —/0.5/0.1 | —/0.5/0.2 | —/0.5/0.2 |
| α-Methylstyrene dimer | 0.2/—/— | | |

TABLE 18

|  | Examples |  | C. E. |
| --- | --- | --- | --- |
| Latex No. | 57 | 58 | 59 |
| Gel content (%) | 48 | 78 | 83 |
| Formulation | I | II | II |
| RI Dry Pick | 2.5 | 1.3 | 2.3 |
| Anticontamination of backing roll | 1.3 | 2.3 | 2.6 |

What is claimed is:

1. An adhesive composition comprising a copolymer latex which is prepared by a process comprising emulsion polymerizing a monomer mixture comprising 10 to 72.5% by weight of 1,3-butadiene, 0.5 to 10% by weight of an ethylenically unsaturated carboxylic acid monomer, and 10 to 89.5% by weight of at least one monomer selected from the group consisting of styrene, methyl methacrylate, β-hydroxyethyl acrylate, acrylonitrile, and acrylamide, in the presence of 0.1 to 30 parts by weight per 100 parts by weight of the monomer mixture of a cyclic unsaturated hydrocarbon having one unsaturated bond in a ring, said cyclic unsaturated hydrocarbon being selected from the group consisting of cyclohexene and cyclopentene, said at least one other monomer comprising styrene, said styrene being present in an amount of at least 27% by weight of the monomer mixture.

2. The adhesive composition as claimed in claim 1 which is for back-sizing carpets.

3. The adhesive composition as claimed in claim 1 which is for rock fiber materials.

4. An adhesive composition comprising a copolymer latex prepared by a process comprising emulsion polymerizing a monomer mixture comprising 10 to 72.5% by weight of 1,3-butadiene, 0.5 to 10% by weight of an ethylenically unsaturated carboxylic acid monomer, and 10 to 89.5% by weight of at least one monomer selected from the group consisting of styrene, methyl methacrylate, β-hydroxyethyl acrylate, acrylonitrile, and acrylamide, in the presence of 0.1 to 30 parts by weight per 100 parts by weight of the monomer mixture of a cyclic unsaturated hydrocarbon having one unsaturated bond in a ring, said cyclic unsaturated hydrocarbon being selected from the group consisting of cyclohexene and cyclopentene, said at least one other monomer comprising styrene, said styrene being present in an amount of at least 27% by weight of the monomer mixture, characterized in that a part of a chain transfer agent is added after the completion of addition of the monomer mixture or by a process comprising emulsion polymerizing (a) 10 to 72.5% by weight of 1,3-butadiene, (b) 0.5 to 10% by weight of an ethylenically unsaturated carboxylic acid monomer, and (c) 10 to 89.5% by weight of at least one monomer selected from the group consisting of styrene, methyl methacrylate, β-hydroxyethyl acrylate, acrylonitrile, and acrylamide, in the presence of 0.1 to 30 weight parts per 100 parts by weight of monomer mixture of a cyclic unsaturated hydrocarbon having one unsaturated bond in a ring, said cyclic unsaturated hydrocarbon being selected from the group consisting of cyclohexene and cyclopentene, said at least one other monomer comprising styrene, said styrene being present in the emulsion polymerizing in an amount by weight of at least 27%, characterized in that, after the addition of a monomer mixture containing the monomer (a), a monomer mixture containing no monomer (a) is added.

5. The adhesive composition as claimed in claim 4 which is for back-sizing carpets.

6. The adhesive composition as claimed in claim 4 which is for rock fiber materials.

7. The adhesive composition as claimed in claim 1 wherein from 0.05 to 10 parts by weight of a chain transfer agent consisting of alkyl mercaptan or of alkyl mercaptan and alphamethylstyrene dimer is used per 100 parts by weight of monomer mixture.

8. The adhesive composition as claimed in claim 4 wherein in the alterative where part of chain transfer agent is added after completion of the addition of the monomer mixture and in the alternative where monomer mixture containing no monomer (a) is added after addition of monomer mixture containing monomer (a), from 0.05 to 10 parts by weight of a chain transfer agent consisting of alkyl mercaptan or of alkyl mercaptan and alphamethylstyrene dimer is used per 100 parts by weight of monomer mixture.

* * * * *